US008612848B2

(12) United States Patent
Jeong

(10) Patent No.: US 8,612,848 B2
(45) Date of Patent: Dec. 17, 2013

(54) N-UP DISPLAY METHOD AND APPARATUS, AND IMAGE FORMING DEVICE THEREOF

(75) Inventor: Jong-un Jeong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1176 days.

(21) Appl. No.: 11/487,355

(22) Filed: Jul. 17, 2006

(65) Prior Publication Data

US 2007/0024913 A1 Feb. 1, 2007

(30) Foreign Application Priority Data

Jul. 29, 2005 (KR) ........................ 10-2005-0069670

(51) Int. Cl.
*G06F 17/00* (2006.01)

(52) U.S. Cl.
USPC ......................................... 715/243

(58) Field of Classification Search
USPC ......................... 715/243, 253, 274
See application file for complete search history.

(56) References Cited

U.S. PATENT DOCUMENTS

| 5,887,081 | A * | 3/1999 | Bantum .................... 382/173 |
| 6,175,423 | B1 * | 1/2001 | Frickey ..................... 358/1.2 |
| 6,324,545 | B1 * | 11/2001 | Morag ....................... 707/202 |
| 6,636,650 | B1 * | 10/2003 | Long et al. ................. 382/295 |
| 6,701,015 | B2 * | 3/2004 | Fujimoto et al. ........... 382/199 |
| 6,850,247 | B1 * | 2/2005 | Reid et al. ................. 345/611 |
| 7,068,834 | B1 * | 6/2006 | Ikeda et al. ............... 382/145 |
| 7,289,132 | B1 * | 10/2007 | Reid et al. ................ 345/660 |
| 7,450,785 | B2 * | 11/2008 | Haas et al. ................. 382/305 |
| 2001/0024291 | A1 * | 9/2001 | Mori et al. ................. 358/1.12 |
| 2001/0043359 | A1 * | 11/2001 | Mori et al. ................. 358/1.15 |
| 2002/0040375 | A1 * | 4/2002 | Simon et al. ............... 707/517 |
| 2002/0122067 | A1 * | 9/2002 | Geigel et al. .............. 345/788 |
| 2003/0160975 | A1 * | 8/2003 | Skurdal et al. .............. 358/1.2 |
| 2003/0191756 | A1 * | 10/2003 | Oh ............................ 707/3 |
| 2003/0222889 | A1 * | 12/2003 | Parulski et al. ............ 345/619 |
| 2004/0139398 | A1 * | 7/2004 | Testa et al. ................. 715/517 |

(Continued)

FOREIGN PATENT DOCUMENTS

| JP | 2000-270199 | 9/2000 |
| JP | 2003-195412 | 7/2003 |
| JP | 2004-62274 | 2/2004 |
| KR | 2002-74696 | 10/2002 |

OTHER PUBLICATIONS

Loui, Alexander et al., "Automatic Image Event Segmentaion and Quality Screening for Albuming Applications", Jul. 2000.*

(Continued)

*Primary Examiner* — Frank D Mills
(74) *Attorney, Agent, or Firm* — Staas & Halsey LLP

(57) ABSTRACT

A display method and an apparatus to display a plurality of images on a screen, and an image forming apparatus to performs the N-up display method, wherein the image display method includes: classifying the images according to the similarities in their shapes on the basis of horizontal length information and vertical length information of the images; and displaying the images on the display screen such that images having similar shapes are positioned adjacent to each other. Therefore, by positioning images having similar, or corresponding, shapes at adjacent positions when images to be printed are displayed on a display unit, such as a liquid crystal display (LCD) included in the image forming apparatus, a reduction of blank spaces between displayed images and an increase of the number of images that can be displayed on a screen are promoted.

20 Claims, 5 Drawing Sheets

(56) References Cited

U.S. PATENT DOCUMENTS

| | | | |
|---|---|---|---|
| 2004/0161141 A1* | 8/2004 | Dewaele | 382/132 |
| 2004/0174544 A1* | 9/2004 | Cassidy et al. | 358/1.8 |
| 2004/0174563 A1* | 9/2004 | Cassidy et al. | 358/1.18 |
| 2005/0071781 A1* | 3/2005 | Atkins | 715/838 |
| 2005/0071783 A1* | 3/2005 | Atkins | 715/851 |
| 2005/0091599 A1* | 4/2005 | Yamakado et al. | 715/732 |
| 2005/0174349 A1* | 8/2005 | Watson | 345/427 |
| 2005/0200912 A1* | 9/2005 | Yamakado et al. | 358/450 |
| 2005/0248778 A1* | 11/2005 | Kim | 358/1.2 |
| 2006/0064639 A1* | 3/2006 | Reid et al. | 715/700 |
| 2006/0103891 A1* | 5/2006 | Atkins | 358/450 |
| 2006/0200758 A1* | 9/2006 | Atkins | 715/517 |
| 2007/0019924 A1* | 1/2007 | Teo et al. | 386/4 |
| 2009/0024914 A1* | 1/2009 | Chen et al. | 715/230 |

OTHER PUBLICATIONS

Sharp. *N-Up Printing/Copying for Sharp MFPs*. Sharp-world.com [online]. 3 pages [retrieved on Mar. 9, 2006]. Retrieved from the Internet <URL: http://sharp-world.com/products/asia-doc/c/convenient/NUp.htm>.

Thomas Net Industrial NewsRoom, *Laser Printers have N-Up printing mode*, Samsung Electronics. news.thomasnet.com [online]. 5 pages, indicated date of Jan. 2002 [retrieved on Mar. 9, 2006]. Retrieved from the Internet <URL: http://news.thomasnet.com/fullstory/6106>.

* cited by examiner ined patent application No. 10-2005-0069670, filed on Jul. 29, 2005, in the Korean Intellectual Property Office, the disclosure of which is incorporated herein in its entirety by reference.

N-UP DISPLAY METHOD AND APPARATUS, AND IMAGE FORMING DEVICE THEREOF

CROSS-REFERENCE TO RELATED PATENT APPLICATIONS

This application claims the benefit of Korean Patent Application No. 10-2005-0069670, filed on Jul. 29, 2005, in the Korean Intellectual Property Office, the disclosure of which is incorporated herein in its entirety by reference.

BACKGROUND OF THE INVENTION

1. Field of the Invention

Aspects of the invention relate to a method and apparatus to display images, and more particularly, to an N-up display method and apparatus to display a plurality of images on a screen, and an image forming apparatus that performs the N-up display method.

2. Description of the Related Art

In general, an image forming apparatus converts document images into coded data and outputs the coded data on a sheet, etc., into a format interpretable by the user, wherein the document is written out by a user through an application program and requested to be printed by the user. In detail, data which is written by a user through an application program installed in a personal computer (PC) and is requested to be printed, is temporally stored in a printer spooler and is then transmitted to an image forming apparatus connected to the PC through a Universal Serial Bus (USB) or a wireless network, such as Bluetooth.

Photo printers which are directly connected to digital cameras or memory cards storing image data, etc. and which print the image data have been developed. Due to the development of portable photo printers, it is possible to capture and print desired images typically without limitations of time and location. In order to allow a user to select images to be printed among images stored in a memory card when a photo printer receives image data from the memory card, the photo printer includes a display device, such as a Liquid Crystal Display (LCD), to display the images stored in the memory card. Also, in order to allow the user to simultaneously check a plurality of images stored in the memory card, the display device included in the photo printer typically has an N-up display function to display a plurality of images on a screen.

FIG. 1 is a view for explaining a conventional method of displaying a plurality of images on a screen, wherein the images are respectively displayed on frames having the same predetermined size, obtained by dividing a single screen into a plurality of regions. According to the conventional N-up display method as described above, since all images are displayed using frames having a predetermined shape regardless of the shapes of the images, it can be inefficient in that many blank spaces between the images typically appear when images having shapes different from the predetermined frame shape are displayed. Thus the number of the displayed images is smaller than the number of images which can be maximally displayed on a screen.

SUMMARY OF THE INVENTION

Aspects of the invention provide a display method and apparatus and an image forming apparatus to perform the display method, to reduce blank spaces between displayed images, to increase the number of images displayed on a screen, or to set the number or arrangement of images displayed on the display screen, or a combination thereof, where a plurality of images are displayed on a screen through a display unit included in the image forming apparatus.

According to an aspect of the invention, there is provided an image display method of displaying a plurality of images on a display screen, including: classifying each image according to horizontal length information and vertical length information to determine a shape of each image; and displaying the images on the display screen, wherein images of the plurality of images which are classified as having a corresponding shape, based on the horizontal length information and vertical length information are adjacently displayed on the display screen.

Also, according to aspects of the invention, in the classification of the images, an image whose horizontal length is longer than its vertical length is classified as having a horizontal shape, and an image whose horizontal length is shorter than its vertical length is classified as having a vertical shape. In the classification of the images, an image whose horizontal length is equal to its vertical length is classified as having a square shape. Further, according to aspects of the invention, in the displaying of the images, images classified as having horizontal shapes are displayed in frames whose horizontal lengths are longer than their vertical lengths, and images classified as having vertical shapes are displayed in frames whose vertical lengths are longer than their horizontal lengths.

Additionally, according to aspects of the invention, the number of the images displayed on the display screen is set by a user or set according to the number of the plurality of images. In the displaying of the images on the display screen, the display screen is divided into upper and lower regions or into left and right regions with images which are classified as having a corresponding shape being displayed on one of the upper and lower regions or on one of the left and right regions.

According to other aspects of the invention, there is provided a method of displaying a plurality of images on a display screen, including: reading classification information to classify images by shape according to the classification information; and displaying the images on the display screen, wherein images that are classified as having a corresponding shape, on the basis of the classification information, are adjacently displayed on the display screen. The image display method further includes generating classification information, on the basis of horizontal length information and vertical length information, of images whose classification information is not read.

Also, according to other aspects of the invention, there is provided an image display apparatus to display a plurality of images on a display screen, including: an image classifying unit to classify the images according to horizontal length information and vertical length information to determine a shape of each image; a layout deciding unit to determine display positions of the images on the display screen wherein images which are classified as having a corresponding shape, based on the horizontal length information and vertical length information are positioned in adjacent display positions; and a display unit to display the images on the display screen according to the determined display positions.

Further, according to aspects of the invention, the image classifying unit classifies an image whose horizontal length is longer than its vertical length as having a horizontal shape, and classifies an image whose horizontal length is shorter than its vertical length as having a vertical shape. Also, the image classifying unit classifies an image whose horizontal length is equal to its vertical length as having a square shape. Also, the display unit displays images classified as having the horizontal shape in frames whose horizontal lengths are longer than their vertical lengths, and displays images classified as having a vertical shape in frames whose vertical lengths are longer than their horizontal lengths.

Additionally, in an image classifying unit according to aspects of the invention, the number of the images displayed on the display screen is set by a user or set to the number of the plurality of the images. Also, the layout deciding unit divides the display screen into upper and lower regions or into left and right regions, and the layout deciding unit determines display positions of the images, with images which are classified as having a corresponding shape being displayed on one of the upper and lower regions or on one of the left and right regions.

Further, according to another aspect of the present invention, there is provided an image display apparatus to display a plurality of images on a display screen, including: a storage unit to store classification information to classify the plurality of the images by shape according to the classification information; a layout deciding unit to read the classification information from the storage unit and to determine display positions of the images, wherein the images that are classified as having a corresponding shape, on the basis of the classification information, are positioned in adjacent display positions; and a display unit to display the images on the display screen according to the determined display positions.

Also, according to another aspect of the present invention, there is provided an image forming apparatus including a function of displaying images, including: a data input unit to receive image data; a print unit to print images using the image data; a size detector to detect horizontal length information and vertical length information of each of the images using the image data; an image classifying unit to classify the images according to shape, on the basis of the horizontal length information and the vertical length information of the images detected by the size detector; a layout deciding unit to determine display positions of the images, wherein images that are classified as having a corresponding shape, on the basis of the horizontal length information and the vertical length information, are positioned in adjacent display positions; and a display unit to display the images on a display screen according to the determined display positions. Also, the data input unit receives the image data from a storage medium which can be removed from, or selectively engage or communicate with, the image forming apparatus. Further, the image forming apparatus includes a storage unit to store the horizontal length information and the vertical length information of the images.

According to another aspect of the present invention, there is provided a computer-readable recording medium having embodied thereon a program, such as a computer program to execute by a processor, such as a computer, the N-up display methods, such as previously described.

Additional aspects and/or advantages of the invention are set forth in the description which follows or are evident from the description, or can be learned by the practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
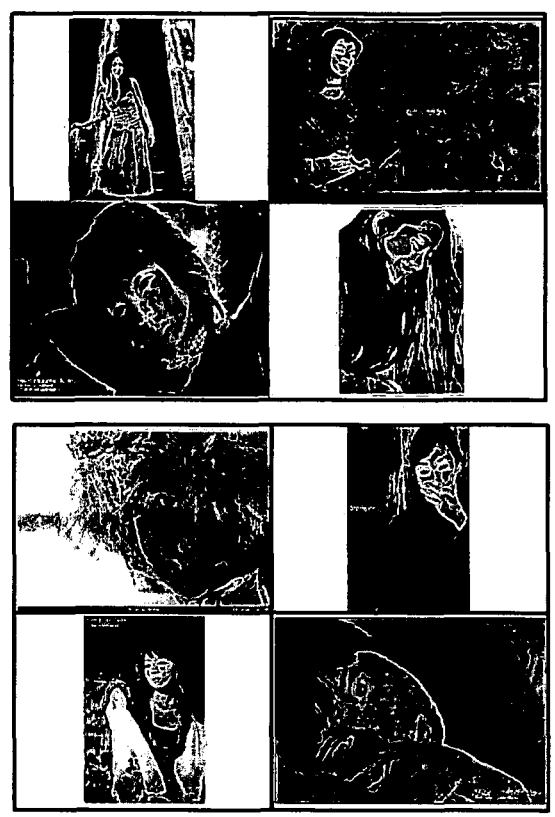
FIG. 1 is a view for explaining a conventional method to display a plurality of images on a screen.

Reference will now be made in detail to embodiments of the invention, examples of which are illustrated in the accompanying drawings, wherein like reference numerals refer to the like elements throughout. The embodiments are described below in order to explain aspects of the invention by referring to the figures, with well-known functions or constructions not necessarily being described in detail.

Figure 2:
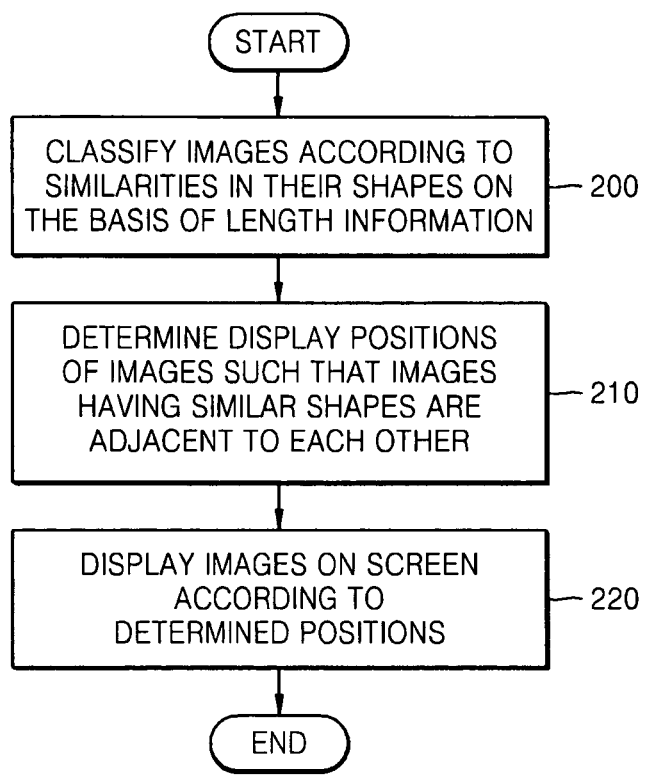
FIG. 2 is a flowchart illustrating a method of displaying a plurality of images on a screen, according to an embodiment of the invention.
Figure 4:
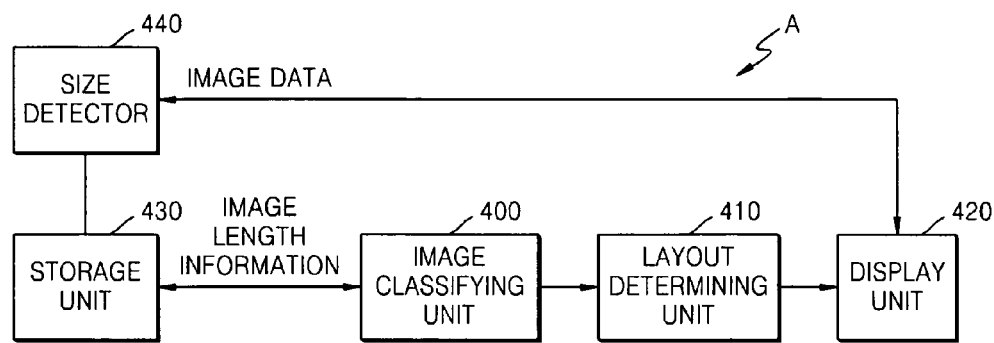
FIG. 4 is a block diagram of an apparatus to display a plurality of images on a screen, according to another embodiment of the invention.

An N-up display method according to an embodiment of the illustrated in FIG. 2 will be described in connection with an N-up display apparatus according to another embodiment of the invention illustrated in FIG. 4. The N-up display apparatus A illustrated in FIG. 4 includes an image classifying unit 400, a layout determining unit 410, and a display unit 420.

The image classifying unit 400 receives size information of a plurality of images, for example, information on the horizontal lengths and the vertical lengths of a plurality of images, classifies the images according to the similarities in their shapes on the basis of the received size information, and generates classification information on the images (operation 200). The image classifying unit 400 can be a processing device, such as a microprocessor or an application specific integrated circuit (ASIC), with associated memory and software or programming, to carry out the functions to classify the images and/or other functions of the N-up display apparatus.

The size information for the images is stored in advance in a storage unit 430. The storage unit 430 stores various programs and/or software and data needed to embody functions of the N-up display apparatus A. The storage unit 430 can include a suitable memory, such as a read only memory (ROM), a random access memory (RAM), and can also include floppy disks, hard disks, optical recording media (e.g., CD-ROMs, DVDs, etc.), and/or other suitable storage media. Where a user selects an N-up display function, the image classifying unit 400 receives the size information of the images from the storage unit 430 and classifies the images according to the similarity in their shapes. Also, a size detector 440 receives image data corresponding to the images and analyzes the received image data, thus detecting the size information of the images. The size detector 440 can be a processing device, such as a microprocessor or an application specific integrated circuit (ASIC), with associated memory and software or programming, to carry out the functions of size detection of the images and/or other functions of the N-up display apparatus.

The image classifying unit 400 classifies the images as horizontal shapes, vertical shapes, and square shapes on the basis of the size information of the images. In detail, an image whose vertical length is longer than its horizontal length is classified as a vertical shape image, and an image whose horizontal length is longer than its vertical length is classified as a horizontal shape image. Also, an image whose horizontal length is equal to its vertical length is classified as a square shape image. The image classifying unit 400 generates classification information indicating that the images are respectively classified as vertical, horizontal and square shape images.

The layout determining, or deciding, unit 410 receives classification information of images to be displayed from the image classifying unit 400, and decides positions at which the images will be displayed (operation 210). The layout determining unit 410 decides the display positions of the images such that images having similar, or corresponding, shapes are displayed at adjacent positions. In this regard, the layout determining unit 410 in determining display positions can reduce blank spaces between displayed images, can increase the number of images displayed on a display screen of the display unit 420, or can set the number or arrangement of the images on the display screen, or a combination thereof. The layout determining unit 410 can be a processing device, such as a microprocessor or an application specific integrated circuit (ASIC), with associated memory and software or programming, to carry out the functions of determining display positions of the images and/or other functions of the N-up display apparatus.

The classification information generated by the image classifying unit 400 is stored in the storage unit 430. The layout determining unit 410 reads the classification information on the images to be displayed from the storage unit 430 where the classification information is stored in the storage unit 430, and determines the display positions of the images. Where classification information on all images to be displayed is stored in the storage unit 430, the classification operation (operation 200) which is performed by the image classifying unit 400 can be omitted. Where classification information on only some of images to be displayed is stored in the storage unit 430, the classification operation (operation 200) is performed only on images whose classification information is not stored in the storage unit 430.

The display unit 420 displays the images at the determined positions using input image data (operation 220). The display unit 420 can, for example, be a monitor embodied with a CRT (Cathode Ray Tube) or a LCD (Liquid Crystal Display), or other suitable display device. The shapes and sizes of frames on which the images are respectively displayed are typically preset. Also, the shapes and sizes of the frames are set differently according to the classified shapes of the images. For example, frames whose vertical lengths are longer than their horizontal lengths are applied to images classified as vertical shape images, so that the images classified as vertical shape images are displayed in such frames. Also, frames whose horizontal lengths are longer than their vertical lengths are applied to images classified as horizontal shape images, so that the images classified as horizontal shape images are displayed in such frames. Further, frames whose horizontal lengths are equal to their vertical lengths are applied to images classified as square shape images, so that the images classified as square shape images are displayed in such frames.

In order to appropriately display images in frames having the predetermined sizes as described above, the horizontal and vertical lengths of images can be enlarged or reduced according to the sizes of the frames. A method for enlarging or reducing images is provided according to an aspect of the invention.

According to aspects of the invention, a method of enlarging or reducing the images according to the frame size where an image classified as a vertical shape image, and where the horizontal-to-vertical ratio of the image is greater than the horizontal-to-vertical ratio of a frame corresponding to the vertical shape image, the image is enlarged or reduced so that the vertical length of the image is equal to the vertical length of the frame corresponding to the vertical shape image. Also, where an image is classified as a vertical shape image, and where the horizontal-to-vertical ratio of the image is smaller than the horizontal-to-vertical ratio of the frame, the image is enlarged or reduced so that the horizontal length of the image is equal to the horizontal length of the frame corresponding to the vertical shape image.

Further, according to aspects of the invention, a method of enlarging or reducing the images according to the frame size where an image classified as a horizontal shape image, and where the vertical-to-horizontal ratio of the image is greater than the vertical-to-horizontal ratio of a frame corresponding to the horizontal shape image, the image is enlarged or reduced so that the horizontal length of the image is equal to the horizontal length of the frame corresponding to the horizontal shape image. Also, where the vertical-to-horizontal ratio of the image is smaller than the vertical-to-horizontal ratio of the frame, the image is enlarged or reduced so that the vertical length of the image is equal to the vertical length of the frame corresponding to the horizontal shape image.

Also, according to aspects of the invention, a method of enlarging or reducing the images according to the frame size where an image classified as a square shape image, and where the vertical-to-horizontal ratio of the image is greater than the vertical-to-horizontal ratio of a frame corresponding to the square shape image, the image is enlarged or reduced so that the horizontal length of the image is equal to the horizontal length of the frame corresponding to the square shape image. Also, where the vertical-to-horizontal ratio of the image is smaller than the vertical-to-horizontal ratio of the frame, the image is enlarged or reduced so that the vertical length of the image is equal to the vertical length of the frame corresponding to the square shape image.

Figure 3A:
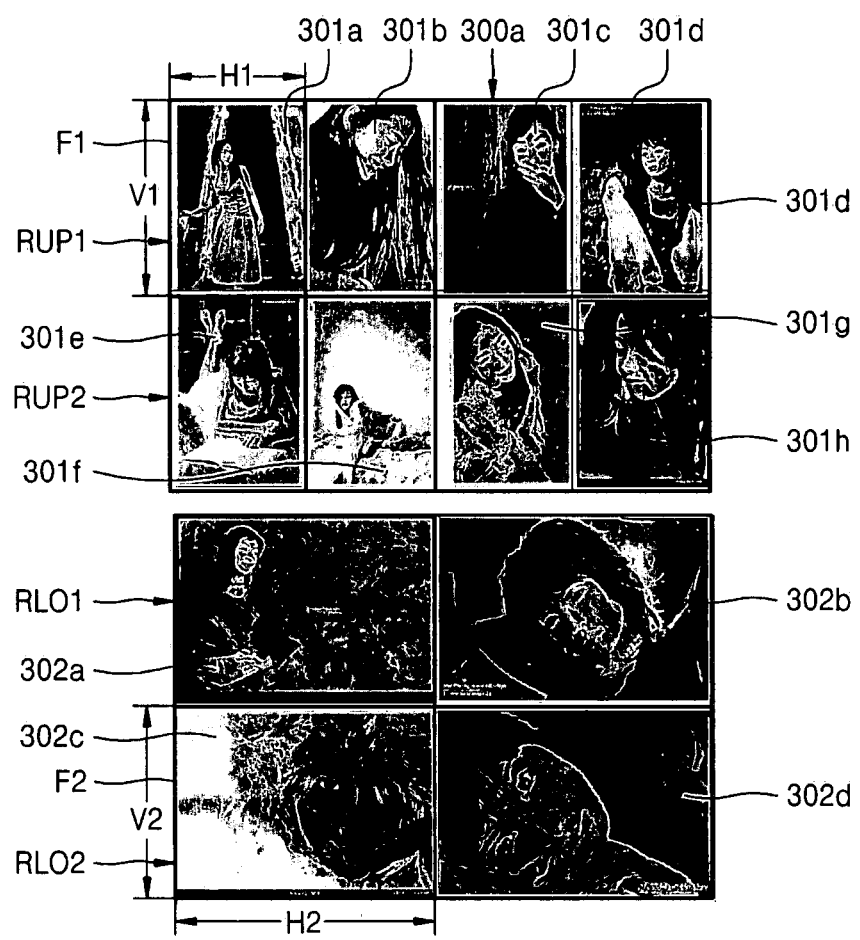
FIGS. 3A, 3B and 3C are views to explain methods of displaying the plurality of images on the screen, according to aspects of the invention and in relation to an embodiment of the invention illustrated in FIG. 2.
Figure 3B:
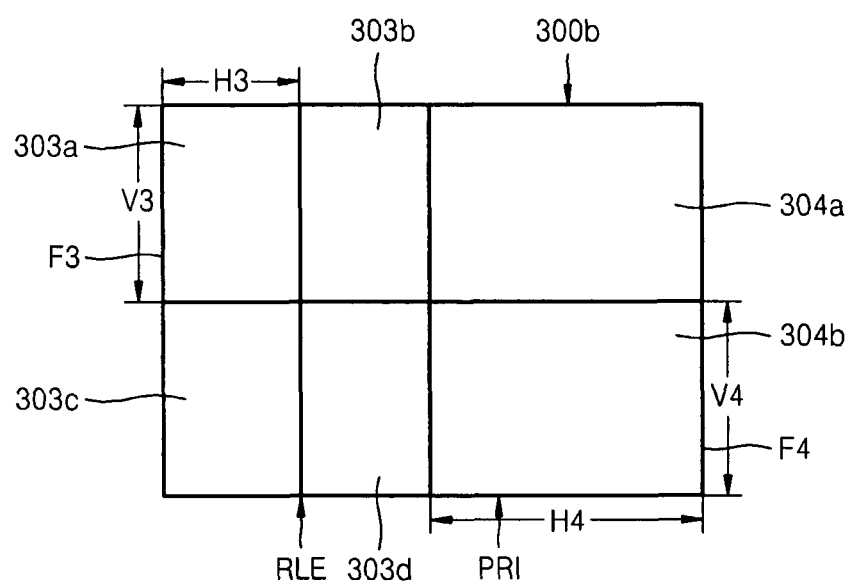
Figure 3C:
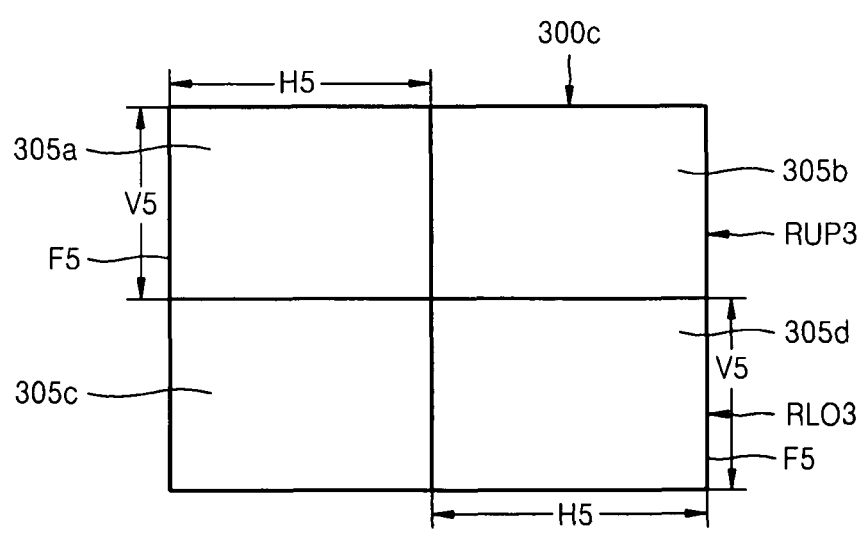

FIGS. 3A, 3B and 3C are views to explain methods of displaying a plurality of images on a screen, according to aspects of the present invention. In FIG. 3A, a screen 300*a* is illustrated, wherein 8 images, 301*a* to 301*h*, as vertical shape images, displayed in frames F1 whose vertical lengths V1 are longer than their horizontal lengths H1, and 4 images, 302*a* to 302*d*, as horizontal shape images, displayed in frames F2 whose horizontal lengths H2 are longer than their vertical lengths V2, are displayed on the screen 300*a*. In FIG. 3A, the screen 300*a* is divided into two upper regions, RUP1 and RUP2, and two lower regions RLO1 and RLO2, and corresponding images are displayed in the respective regions. In the two upper regions RUP1 and RUP2, the vertical shape images 301*a* to 301*h* are displayed adjacent to each other. Further, in the two lower regions RLO1 and RLO2, the horizontal shape images 302*a* to 302*d* are displayed adjacent to each other.

Alternately, as illustrated in FIG. 3B, a display method of dividing a screen into two regions, a left region and a right region, and displaying corresponding images having similar shapes in the respective regions can be used. For example, as illustrated in FIG. 3B, images classified as vertical shape images can be displayed in the left region of a screen and images classified as horizontal shape images can be displayed in the right region of the screen. In FIG. 3B a screen 300*b* is illustrated, wherein 4 images, 303*a* to 301*d*, as vertical shape images, displayed in frames F3 whose vertical lengths V3 are longer than their horizontal lengths H3, and 2 images, 304*a* and 304*b*, as horizontal shape images, displayed in frames F4 whose horizontal lengths H4 are longer than their vertical lengths V4, are displayed on the screen 300*b*. In FIG. 3B, the screen 300*b* is divided into a left region RLE, and a right region RRI, and corresponding images are displayed in the respective regions. In the left region RLE, the vertical shape images 303a to 303d are displayed adjacent to each other. Further, in the right region RRI, the horizontal shape images 304a and 304b are displayed adjacent to each other.

Further, alternately, as illustrated in FIG. 3C, a display method of dividing a screen into two regions, an upper region and a lower region, and displaying corresponding images having similar shapes in the respective regions can be used. For example, as illustrated in FIG. 3C, images classified as square shape images are illustrated as being displayed in the both the upper region and the lower region of a screen. In FIG. 3C, a screen 300c is illustrated, wherein 4 images, 305a to 305d, as square shape images, displayed in frames F5 whose vertical lengths V5 are equal to their horizontal lengths H5, are displayed on the screen 300c. In FIG. 3C, the screen 300c is divided into an upper region RUP3, and lower region RLO3, and corresponding images are displayed in the respective regions. In the upper region RUP3, the square shape images 305a and 305b are displayed adjacent to each other. Further, in the lower region RLO3, the square shape images 305c and 305d are displayed adjacent to each other. Also, according to aspects of the invention, the number of images to be displayed on a screen, such as the screens 300a to 300c, and the arrangement of the regions and the images per region can be set, such as by a user. Alternately, the number of images to be displayed on a screen can be set according to the number of images input to the display unit.

Figure 5:
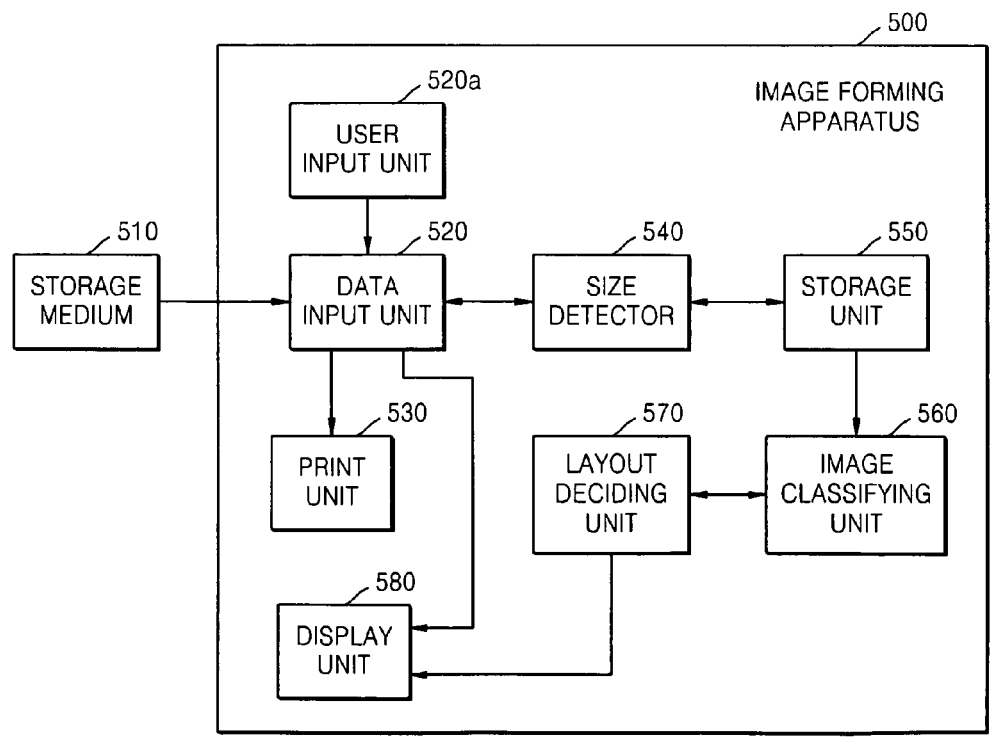
FIG. 5 is a block diagram of an image forming apparatus to display a plurality of images, according to another embodiment of the invention.

FIG. 5 is a block diagram of an image forming apparatus 500 having an N-up display function, according to another embodiment of the invention. Referring to FIG. 5, the image forming apparatus 500 includes a data input unit 520, a print unit 530, a size detector 540, a storage unit 550, an image classifying unit 560, a layout deciding unit 570, and a display unit 580.

The data input unit 520, as a suitable input device and/or interface device, receives image data from an external storage medium 510 in which the image data is stored. The storage medium 510 can include a suitable memory, such as a read only memory (ROM), a random access memory (RAM), and can also include floppy disks, hard disks, optical recording media (e.g., CD-ROMs, DVDs, etc.), and/or other suitable storage media. The storage medium 510 can also be a memory card, such as a smart card which can be removed from, or selectively engage or communicate with, the image forming apparatus 500, or a memory which can be installed in a digital camera. The print unit 530, such as a suitable printer, converts image data to be printed selected by a user among the received image data into printable data, and prints the data.

The size detector 540 analyzes the image data received through the data input unit 520, detects size information of images corresponding to the image data, for example, information about the horizontal and vertical lengths of the images, and stores the size information in the storage unit 550. The storage unit 550 can include a suitable memory, such as a read only memory (ROM), a random access memory (RAM), and can also include floppy disks, hard disks, optical recording media (e.g., CD-ROMs, DVDs, etc.), and/or other suitable storage media. The size detector 540 can be a processing device, such as a microprocessor or an application specific integrated circuit (ASIC), with associated memory and software or programming, to carry out the functions of size detection of the images and/or other functions of the N-up display apparatus 500.

Where the user selects an N-up display function through a user input unit 520a included in, or communicating with the image forming apparatus 500, such as a keyboard or other suitable input device, the image classifying unit 560 classifies the images according to the similarities in their shapes on the basis of the size information of the images stored in the storage unit 550, and generates classification information. The image classifying unit 560 can be a processing device, such as a microprocessor or an application specific integrated circuit (ASIC), with associated memory and software or programming, to carry out the functions to classify the images and/or other functions of the N-up display apparatus 500. The classification information generated by the image classifying unit 560 is stored in the storage unit 550 so that the classification information can be used when the images are displayed on the display unit 580.

The layout deciding unit 570 determines the display positions of the images so that images having similar shapes are displayed at adjacent positions on a display screen of the display unit 580. In this regard, the layout deciding unit 570 in determining display positions of the images can reduce blank spaces between displayed images, can increase the number of images displayed on the display screen of the display unit 580, or can set the number or arrangement of the images on the display screen. The display unit 580 displays the images on a display screen according to the determined positions. The display unit 580 can, for example, be a monitor embodied with a CRT (Cathode Ray Tube) or a LCD (Liquid Crystal Display), or other suitable display device.

The invention and aspects thereof to classify and/or display images can also be embodied as computer readable code on a computer readable recording medium. The computer readable recording medium is any data storage device that can store data which can be thereafter read by a computer system, or other suitable processing device. Examples of the computer readable recording medium include read-only memory (ROM), random-access memory (RAM), CD-ROMs, magnetic tapes, floppy disks, and optical data storage devices.

As described above, in an N-up display method and apparatus and an image forming apparatus performing an N-up display method, according to aspects of the invention, by positioning images having similar, or corresponding, shapes at adjacent positions when images, such as to be printed, are displayed on a display unit, such as a liquid crystal display (LCD) included in an image forming apparatus, a reduction of blank spaces between displayed images and/or an increase of the number of images that can be displayed on a screen of a display unit, or other suitable display apparatus, are promoted, and/or the number or arrangement of the images on the display screen can be set.

The foregoing embodiments, aspects and advantages are merely exemplary and are not to be construed as limiting the invention. Also, the description of the embodiments of the invention is intended to be illustrative, and not to limit the scope of the claims, and various other alternatives, modifications, and variations will be apparent to those skilled in the art. Therefore, although a few embodiments of the invention have been shown and described, it would be appreciated by those skilled in the art that changes may be made in the embodiments without departing from the principles and spirit of the invention, the scope of which is defined in the claims and their equivalents.

What is claimed is:

1. An image display method of displaying a plurality of images on an image forming apparatus having a display screen, comprising:
receiving in the image forming apparatus a plurality of images;

classifying each of the images according to horizontal length information and vertical length information of the images to determine a shape of each of the images; and displaying the images on the display screen, wherein all images that are classified as having a corresponding shape are adjacently displayed on the display screen to increase a quantity of images that may be simultaneously displayed on the display screen.

2. The image display method of claim 1, wherein:
in the classifying of the images, an image having a horizontal length longer than a vertical length of the image is classified as a horizontal shape image, and an image having a horizontal length shorter than a vertical length of the image is classified as a vertical shape image.

3. The image display method of claim 2, wherein:
in the classifying of the images, an image having a horizontal length equal to a vertical length of the image is classified as a square shape image.

4. The image display method of claim 2, wherein:
in the displaying of the images, images classified as horizontal shape images are displayed in frames having horizontal lengths longer than vertical lengths of the frames, and images classified as vertical shape images are displayed in frames having vertical lengths longer than horizontal lengths of the frames.

5. The image display method of claim 1, further comprising:
setting by a user a number of the images displayed on the display screen, or
setting the number of images to be displayed on the display screen as the number of the plurality of images.

6. The image display method of claim 1, wherein the displaying the images further comprises:
dividing the display screen into upper and lower regions or into left and right regions, and
displaying images which are classified as having a corresponding shape on one of the upper and lower regions or on one of the left and right regions.

7. A method of displaying a plurality of images on an image forming apparatus having a display screen, comprising:
receiving in the image forming apparatus a plurality of images;
reading classification information to classify the images by shape according to the classification information; and
displaying the images on the display screen, wherein all images that are classified as having a corresponding shape, on the basis of the classification information, are adjacently displayed on the display screen to increase a quantity of images that may be simultaneously displayed on the display screen.

8. The method of claim 7, further comprising:
generating classification information, based on horizontal length information and vertical length information, of the images whose classification information is not read.

9. An image forming apparatus to display a plurality of images on a display screen, comprising:
a data input unit to receive image data;
an image classifying unit to classify the images according to horizontal length information and vertical length information of the images to determine a shape of each of the images;
a layout deciding unit to determine display positions of the images on the display screen, wherein all images that are classified as having a corresponding shape, based on the horizontal length information and the vertical length information of the images, are positioned in adjacent display positions; and
a display unit to display the images on the display screen according to the determined display positions.

10. The image forming apparatus of claim 9, wherein:
the image classifying unit classifies an image having a horizontal length longer than a vertical length of the image as a horizontal shape image, and classifies an image having a horizontal length shorter than a vertical length of the image as a vertical shape image.

11. The image forming apparatus of claim 10, wherein:
the image classifying unit classifies an image having a horizontal length equal to a vertical length of the image as a square shape image.

12. The image forming apparatus of claim 10, wherein:
the display unit displays images classified as horizontal shape images in frames having horizontal lengths longer than vertical lengths of the frames, and displays images classified as vertical shape images in frames having vertical lengths longer than horizontal lengths of the frames.

13. The image forming apparatus of claim 9, wherein:
the number of the images displayed on the display screen is set by a user or is set as the number of the plurality of the images.

14. The image forming apparatus of claim 9, wherein:
the layout deciding unit divides the display screen into upper and lower regions or into left and right regions, and determines display positions of the images such that images which are classified as having a corresponding shape are displayed on one of the upper and lower regions or on one of the left and right regions.

15. An image forming apparatus to display images, comprising:
a data input unit to receive image data;
a print unit to print images using the image data;
a size detector to detect horizontal length information and vertical length information of the images using the image data;
a storage unit to store the detected horizontal length information and the detected vertical length information of the images;
an image classifying unit to classify the images according to shape, based on the stored horizontal length information and the stored vertical length information of the images detected by the size detector;
a layout deciding unit to determine display positions of the images, wherein all images that are classified as having a corresponding shape, on the basis of the horizontal length information and the vertical length information of the images, are positioned in adjacent display positions; and
a display unit to display the images on a display screen according to the determined display positions.

16. The image forming apparatus of claim 15, wherein:
the data input unit receives the image data from a storage medium, wherein the storage medium selectively engages or communicates with the image forming apparatus.

17. The image display apparatus of claim 15, wherein:
the display unit displays images classified as horizontal shape images in frames having horizontal lengths longer than vertical lengths of the frames,
displays images classified as vertical shape images in frames having vertical lengths longer than horizontal lengths of the frames, and
displays images classified as square shape images in frames having horizontal lengths equal to vertical lengths of the frames.

18. An image display method of an image forming apparatus having a display screen, comprising:

classifying images according to horizontal length information and vertical length information of the images to determine a shape of each of the images; and determining display positions of the images to position all images that are classified as having a corresponding shape, based on the horizontal length information and the vertical length information, in adjacent display positions to increase a quantity of images that may be simultaneously displayed on the display screen; and displaying the images on the display screen according to the determined display positions.

19. The image display method of claim 18, wherein the determining display positions of the images further comprises:

determining display positions of the images to reduce blank spaces between displayed images, to increase the number of images displayed on the display screen, or to set the number or arrangement of the images on the display screen.

20. An image display apparatus having a display screen, the apparatus comprising:

an image classifying unit, controlled by a processor, to classify images according to horizontal length information and vertical length information of the images to determine a shape of each of the images;

a layout deciding unit to determine display positions of the images, wherein all images that are classified as having a corresponding shape, based on the horizontal length information and the vertical length information, are positioned in adjacent display positions to increase a quantity of images that may be simultaneously displayed on the display screen; and a display unit to display the images on the display screen according to the determined display positions.

* * * * *

UNITED STATES PATENT AND TRADEMARK OFFICE
CERTIFICATE OF CORRECTION

PATENT NO. : 8,612,848 B2  
APPLICATION NO. : 11/487355  
DATED : December 17, 2013  
INVENTOR(S) : Jeong Page 1 of 1

It is certified that error appears in the above-identified patent and that said Letters Patent is hereby corrected as shown below:

On the Title Page Item [56] (OTHER PUBLICATIONS), Line 1, delete "Segmentaion" and insert -- Segmentation --, therefor.

Signed and Sealed this
First Day of July, 2014

Michelle K. Lee
*Deputy Director of the United States Patent and Trademark Office*